United States Patent [19]

Mason

[11] 4,322,754
[45] Mar. 30, 1982

[54] SYSTEMS FOR PROCESSING PRINTED DATA

[75] Inventor: Kenneth Mason, Hayling Island, England

[73] Assignee: Kenneth Mason Holdings Limited, Hampshire, England

[21] Appl. No.: 50,784

[22] Filed: Jun. 21, 1979

Related U.S. Application Data

[63] Continuation of Ser. No. 828,145, Aug. 26, 1977, abandoned.

[30] Foreign Application Priority Data

Aug. 31, 1976 [GB] United Kingdom ............... 36014/76
Dec. 7, 1976 [GB] United Kingdom ............... 50950/76

[51] Int. Cl.³ ............................................. H04N 1/22
[52] U.S. Cl. ..................................... 358/296; 235/456; 235/462; 235/472; 340/146.3 AH; 358/127; 358/128.5
[58] Field of Search ................. 358/127, 128.5, 128.6, 358/302, 130, 296, 300, 294, 102, 241, 147; 340/706, 710, 724, 787, 146.3 AH, 146.3 Z, 794, 795, 796, 707, 709; 178/18, 19, 20; 250/359, 361, 362; 235/456, 462, 472; 364/900 MS File; 179/100.1 G

[56] References Cited

U.S. PATENT DOCUMENTS

| | | | |
|---|---|---|---|
| 3,541,248 | 11/1970 | Young | 358/294 X |
| 3,582,886 | 6/1971 | Hardin et al. | 358/102 |
| 3,612,758 | 10/1971 | Evans et al. | 340/787 |
| 3,674,928 | 7/1972 | Yoshiyama et al. | 358/241 |
| 3,689,932 | 9/1972 | Gerber | 358/302 X |
| 3,790,703 | 2/1974 | Carley | 358/296 |
| 3,806,643 | 4/1974 | Russell | 358/130 |
| 3,870,814 | 3/1975 | Woods et al. | 358/102 |
| 3,885,094 | 5/1975 | Russell | 179/100.1 G |
| 3,913,090 | 10/1975 | Fischer | 358/241 |
| 3,918,029 | 11/1975 | Lemelson | 235/472 X |
| 3,961,137 | 6/1976 | Hutt et al. | 358/147 X |
| 3,970,775 | 7/1976 | Lemelson | 358/102 |
| 4,006,298 | 2/1977 | Fowler et al. | 340/707 |
| 4,007,443 | 2/1977 | Bromberg et al. | 340/709 |
| 4,013,876 | 3/1977 | Anstin | 358/302 X |
| 4,015,285 | 3/1977 | Romeas | 358/128.5 |
| 4,072,818 | 2/1978 | Coviello | 358/302 X |
| 4,110,662 | 8/1978 | Greeneich et al. | 358/241 |
| 4,121,249 | 10/1978 | Lemelson | 358/102 X |
| 4,161,728 | 7/1979 | Insam | 358/147 X |

Primary Examiner—Raymond F. Cardillo, Jr.
Assistant Examiner—Donald McElheny, Jr.
Attorney, Agent, or Firm—Larry S. Nixon

[57] ABSTRACT

A data processing unit including means for reducing original data or producing the data in coded form and for recording the same on photographic or magnetic media e.g. photographic film or disc or magnetic tape, scanning means for sensing the data recorded on the record media to produce electrical signals indicative of the reduced or coded data and means including decoding means where the original data is coded and responsive to the signals from the scanning means for reproducing the data on a static visual reading device e.g. an electrophoretic memory unit, in a legible form recognizable by a reader. The decoding means is responsive to address data signals from the scanning means to produce output signals indicative of the coded data in decoded form.

17 Claims, 7 Drawing Figures

SYSTEMS FOR PROCESSING PRINTED DATA

CROSS-REFERENCES TO RELATED APPLICATIONS

This is a continuation of application Ser. No. 828,145 filed Aug. 26, 1977, now abandoned.

BACKGROUND AND SUMMARY OF THE INVENTION

This invention relates to a system and apparatus for processing printed data.

It is well known in order to conserve storage space to condense the bulk of a document, book or other printed media by photographically reproducing the printed matter on a reduced scale on for instance microfilm and enlarging the printed matter to a size readily recognisable to a reader, by advancing the microfilm past an optical reading head. Such a process has the advantage of condensing the information contained in for instance, a book, thereby reducing the size and bulk of the vehicle required to carry the printed matter.

An object of the present invention is to provide a system and apparatus for converting original data to a different form and reconverting the data to a form recognisable by a reader, with the apparatus being compact so as to be sufficiently portable to be carried in a person's pocket and comparatively inexpensive and of low power consumption.

A more specific object of one aspect of the invention is to convert the original data to a coded form and recording the same magnetically or photographically, and to reconvert the coded form of the data back to a form recognisable by a reader.

Another object of the invention is to convert the original data into a different form e.g. by reduction and to reconvert the reduced form to a form recognisable by a reader.

Thus, according to one aspect of the present invention there is provided a data processing unit including means for converting original data to a different form e.g. a reduced and/or coded form, and recording the same on photographic or magnetic record media, means for scanning the data recorded on said media, to produce electrical signals indicative thereof and means responsive to the said signals for reproducing the original data on a static visual reading device in a legible form recognisable by a reader.

According to a further aspect of the invention there is provided a data processing unit including data reading means for scanning coded data recorded on photographic or magnetic record media as it advances past a reading head, decoding means responsive to address data signals from said reading means to produce output signals indicative of the coded data in decoded form and a static visual display device including means responsive to signals from the decoding means for producing the original data in legible form recognisable to a reader.

In one embodiment of the invention there is provided a system and apparatus for processing printed data including means for recording the data in coded form on photographic or magnetic media, means for scanning the coded data to produce signals indicative thereof, means responsive to said signals for decoding the coded data and viewing means responsive to signals from the decoding means for converting signals from the decoding means into a legible form recognisable to a viewer.

In a further embodiment of the invention the original data is photographically reduced on to a microrecord e.g. a microfische or microfilm and reproduced on a visual display device in a legible form recognisable to a reader, without requiring the intermediate stages of coding of the original data and subsequent decoding of the coded data, thereby enabling existing libraries of photographically reduced information to be used.

The visual display device for the reproduction of data in legible form may utilise electrophoretic, electrochromic or electrochromatic material or plasma panels, or thermionics or electroluminescent materials capable of converting coded data into a legible form recognisable by a reader.

In an embodiment of the invention where a microrecord of the original data is produced, a data reading unit including, for example, a photocell reading head, is arranged to scan a small portion, e.g. a line of a larger portion e.g. a page of the original data photographically reduced and recorded on the microrecord e.g. a microfische. The scanning is performed by a scanning generator operating in synchronism with the designated columns of a matrix of a visual display device. To effect scanning of the selected portion of the microfische, the latter is moved on a rotating mirror or prism. This vertical scan of the microfische is synchronised with the designated rows of the matrix of the display device via, for example, a position encoder on the shaft of the rotating mirror, or with the movement of the Y axis of the microfische. In a further embodiment of the invention applicable to microrecords, the reading head is replaced by a raster scan camera.

In an embodiment of the invention where the original data is coded and subsequently decoded, there is provided a reading head past which photographic film is advanced. The film from a supply spool is wound on a take-up spool provided with a manual winder and the reading head scans the coded data on the film to produce electrical signals indicative of the coded data and which are supplied to a decoding unit. The decoder converts the incoming signals into signals having a matrix form of points corresponding to the crossover coordinates of the rows and columns of a matrix. These crossover points may be defined by small dot matrices of a predetermined number of columns and rows. Signals from the X and Y coordinates of the matrix are supplied to discrete electrophoretic devices of a display panel such that the original printed data is reproduced in legible, recognisable form.

The original data may be specially typed data e.g. as the output from a computer programmed to print out data in any required code.

BRIEF DESCRIPTION OF THE DRAWINGS

The invention will now be described by way of example only with particular reference to the accompanying drawings wherein.

DESCRIPTION OF THE PREFERRED EMBODIMENTS

Figure 1:
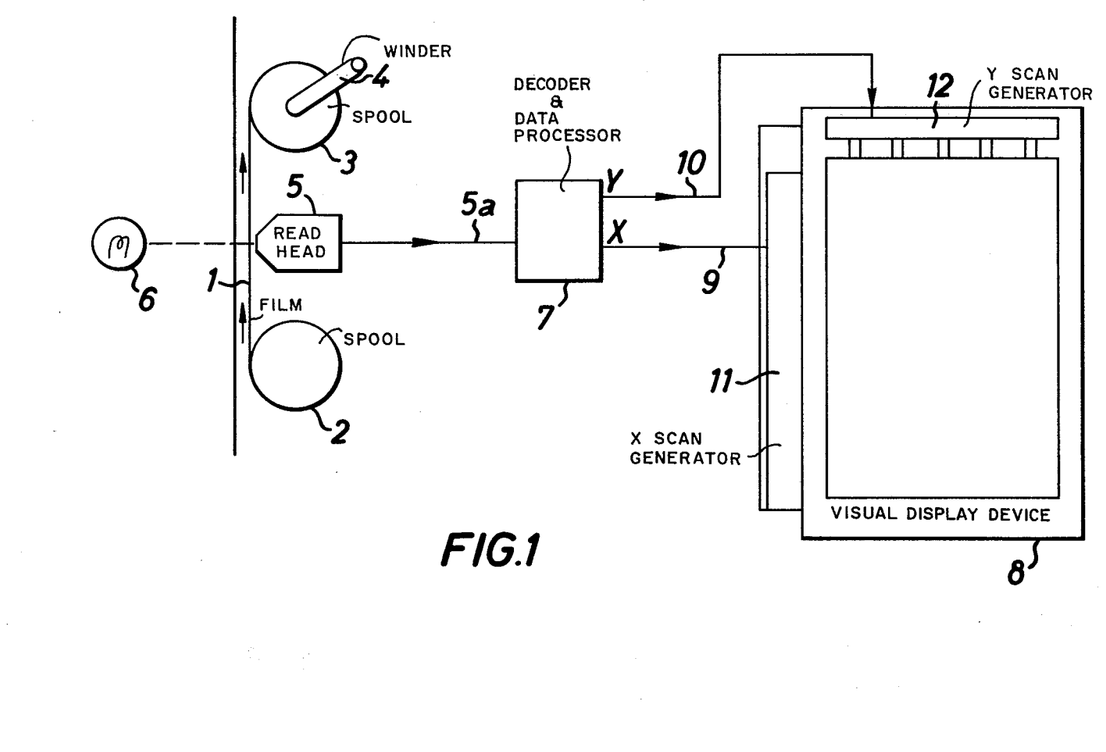
FIG. 1 is a block diagram showing the general layout of a data processing unit of the present invention where the original data is recorded in coded form on photographic film and the coded data subsequently decoded.

In the embodiment shown in FIG. 1 original printed data is reproduced in coded form on photographic film 1 e.g. 16 mm film, which is fed from a supply spool 2 to a take-up spool 3 provided with a manual winder 4, and the film advances past the reading head 5 intermediate a light source 6 and the head 5. A decoder and temporary data processor 7 receives signals from the reading head 5 and supplies decoded signals to the X and Y scan generators of the display unit.

The film is divided into a plurality of 'frames' and each frame corresponds to a page of printed matter, with each frame containing a plurality of 'lines', each 'line' corresponding to a line of print. Each 'line' on the film is arranged transversely to the direction of movement of the film and consists of a series of black and white dots corresponding to a binary '0' or '1'. For standard codes such as ASC II, seven dots is typically required to represent any alphanumeric character in binary coded form. Because of the high resolution of the film, the dots may be placed quite close together.

The first 'line' of a 'frame' represents the page number and other organisational data required by the decoder and processor. A feature of the encoding system of the present invention is that a first predetermined number of dots e.g. 7, in a 'line' define the 'address' i.e. the position on the page of the remaining characters in the line of typescript which is to be reproduced. This allows for overprinting and correction which simplifies the initial manufacture of the film strip. A further advantage is that precise location of the coded data on the film and the precise positioning of the reading head is not necessary. Thus, for instance, if the film is advanced too much, the 'line' addressed will write up its correct position on the display preceded by a blank, which can subsequently be filled in by moving the film strip in reverse. However, the reading speed is such that the film may be advanced continuously at a relatively slow speed and the coding on the film strip is grouped in accordance with the page numbering as in a conventional book. A gap in the information will indicate to the operator that all the lines on a page of the printed matter have been completed. Thus, each 'line' in a 'frame' on the film strip would contain at least some of the following:

(a) A first dot for registration purposes. This will always be present.

(b) A first character group of a predetermined number of dots e.g. 7 giving the line address of the page corresponding to the 'frame' in which the dots are located; the precise number of dots depending on the scan technique.

(c) A second group of a number of dots e.g. 7 to 9 giving the inter line address for diagrams or special characters on a page, or to take account of different widths of characters. It should be noted that not all letters and alpha-numeric characters are of the same width and occupy the space scanned by the scanning generators e.g. shift registers. Where a narrow letter is scanned the start of the next letter may be delineated on the same forward scan of the shift register. It is only necessary to ensure that the decoder or processor unit is programmed to recognise the narrow characters and advance the 'bright up' timing accordingly.

(d) At least some of the remaining groups of dots each defining the characters, spaces and punctuation in each line of print.

(e) Additional dots providing an error checking code facility using parity code techniques.

The reading head 5 is conveniently an integrated circuit consisting of a self-scanned I.C. array consisting of a shift register and photodiode rectilinear array which may be spaced 0.001" apart. Alternatively a multiple rectilinear array may be used, e.g. seven arrays may simultaneously scan the coded characters on the film. Thus, a complete line of typescript which is normally up to 60 characters will be accommodated within the width of a 16 mm film strip. With the alternative multiple array scanning method, a narrower film strip can be used and by 'track shifting' laterally across the film, additional data scans may be made. Synchronisation of the scanning and film positioning is based on the first dot of the address code or on another dot and separate photocell which when energised initiates the scanning of the shift register. By using a serial/parallel data transfer technique, only the minimum number of inter-connections are required to the decoder circuit 7 thereby achieving economy with increased reliability. Thus, the reading head 5 senses the coded data on the film 1 to produce electrical signals indicative of the coded address data and which are supplied to the matrix of the decoder unit 7 over ASC II serial code line 5a.

The decoder 7 converts the incoming signals into signals having a matrix form of points corresponding to the crossover coordinates of the rows and columns of a matrix. Signals from the X and Y coordinates of the matrix are supplied to discrete electrophoretic devices of a visual display panel 8 via X and Y lines 9, 10.

The visual display device 8 consists of two glass plates with transparent conducting patterns on the inner surface of the glass which are separated by a small gap of approximately 20 microns. The space between the glass plates is filled with a mixture of a darkly coloured non-polar dispersant, e.g. dyed thin oil and titanium dioxide. The titanium dioxide is surface activated so that it carries a surface charge such that when the two electrodes are connected to a potential source, the pigment will migrate through the solvent and appear as a pattern on one of the glass plates. The essential feature of this process is that once the pigment has moved to the plate, it is held there by electrostatic forces even after the electrodes are disconnected from the potential source, thus providing a permanent memory device. To erase the display, it is necessary to reverse the polarity of the electrodes, and it is this feature which permits the addressing of successive lines of typescript to occur until a page is complete. It follows therefore that once the page has been written, the electronic controls may be switched off for as long as required to read the page on the visual display. The organisation of the dots on the page is achieved by having vertical columns on the upper glass plate; some 1000 conducting electrodes being required with small spaces therebetween. The electrodes for the rows are carried on the lower glass plate but this time grouped in batches of any required number say 9 or 11 to encompass any typescript with a spare line or lines above and below which would not normally be written on and corresponding to the space between each line of typescript. This line is addressed by an additional coding arrangement on the original film strip. Subsidiary coding circuits with two or more groups of rows and column matrices may be used to show an expanded character which would be suitable for people with poor eyesight. The number of electrodes which require to be connected on the glass plates presents a special problem but this is overcome by the use of thin film transistors. If the electrodes are deposited by a vacuum deposition process e.g. metal evaporation through a mask, then these electrodes may be brought out to the edge of the glass and themselves form the connections to logic circuits consisting of thin film transistors, deposited in the same vacuum chamber as the original electrodes. Typical semi-conductor materials are cadmium selenide and indium arsenide. The semi-conductor material may be deposited on a silicon dioxide layer which is itself compatible and commonly deposited on glass substrates. The transistors are preferably of the field effect type and would be protected after deposition with a further layer of, for example, silicon dioxide, or other suitable encapsulant. The inherent advantage of this process is the low cost of the materials and the fact that inter-connections are easily made by metal deposition without the need for bonding wires. A typical production technique uses a tunnel vacuum oven with automatic mask positioning so that each part of the process of putting the electrodes and semi-conductor logic circuits together with the connections to the edge of the glass is done on a continuous process. The logic circuit may be considered as a shift register which transfers potential across each row and column sequentially under the control of decoder circuit 7. Because the scanning generator is in fact part of the glass electrodes; the matrix of the display device forms an extension of the scanning generator connections; it is therefore unnecessary to provide enough connectors to define completely the address of the rows and columns and the pattern of the dot matrix. Typically therefore there are 4 connectors to the upper panel and approximately 16 to the lower panel for the sequential scan method. Between the scanning generator, display unit and the photocells, the decoder circuit is introduced. This decoder circuit controls the scanning matrix of the display. It receives the serial information from the photocell array of the reading head, holds it in a temporary store, recodes it and releases data in a modified form so that the ASC II code dot pattern is translated into a brightness modulation signal which gates the output potential of one of the scanning registers in accordance with the character shape as defined by a character matrix of predetermined size. This decoder circuit may be a special purpose integrated circuit or alternatively a general purpose microprocessor programmed for the purpose. The X scan generator and Y scan generator are shown diagrammatically at 11, 12 in FIG. 1.

Such a display device, by virtue of a re-addressing technique, allows overwriting by re-addressing parts of the display, firstly with a reversed polarity to cancel any previous information when required and then with fresh information to present a slowly changing pattern or picture or diagram e.g. mimic diagrams as the record media is slowly moved past the reading head.

Figure 2:
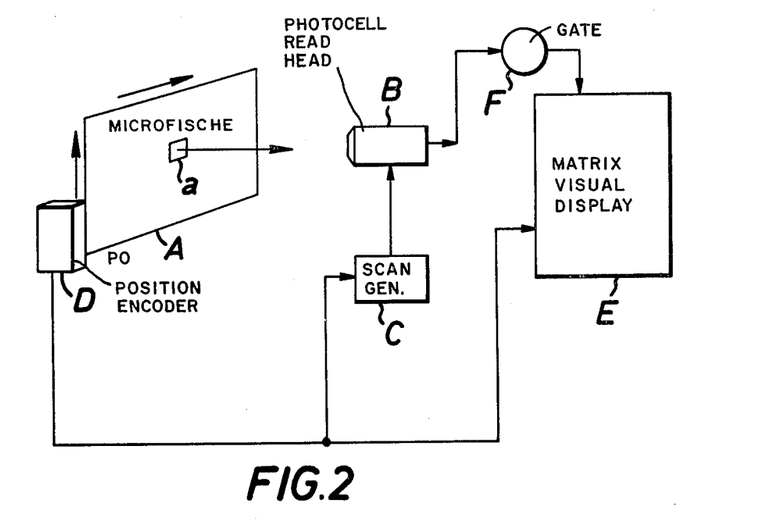
FIG. 2 is a block diagram of a general layout similar to that of FIG. 1 but where the original data is recorded on a microfische.
Figure 3:
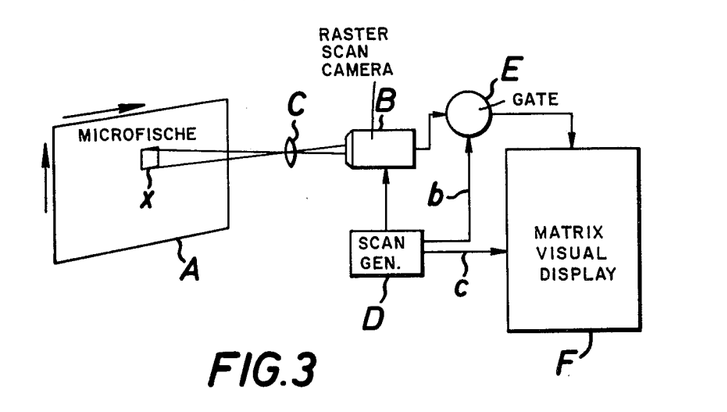
FIG. 3 is a block diagram similar to that of FIG. 2 but where the photocell reading head is replaced by a raster scan camera.

FIGS. 2 and 3 illustrate embodiments of that aspect of the invention where no decoding of data is required. One such arrangement is illustrated in FIG. 2 in which a selected portion a of a microfische A is scanned by a photocell reading head B controlled by signals derived from a scan generator C. The generator C also receives input signals from a mechanically driven position encoder D, which signals represent the position of the mirofische A, and output signals from the encoder are fed to the scan generator and also to the rows of the matrix E of the visual device; output signals from the reading head B being supplied via a gating device F to the columns of the matrix E.

In an alternative embodiment of the aspect of the invention relating to microrecords, the photocell reading head of the previous embodiment is replaced by a raster scan camera which is controlled by signals devised from a scan generator which also provides signals for the rows and columns of the matrix of the visual display device. Such an arrangement is shown by way of example only in block form in FIG. 3 in which a portion x of a microfische A, is scanned by a raster scan camera B via a lens system C, the camera B being controlled by signals derived from a scan generator D which also supplies signals via line b and gate E to the columns, and via line C to the rows of the matrix F of the visual display device.

Figures 4, 5:
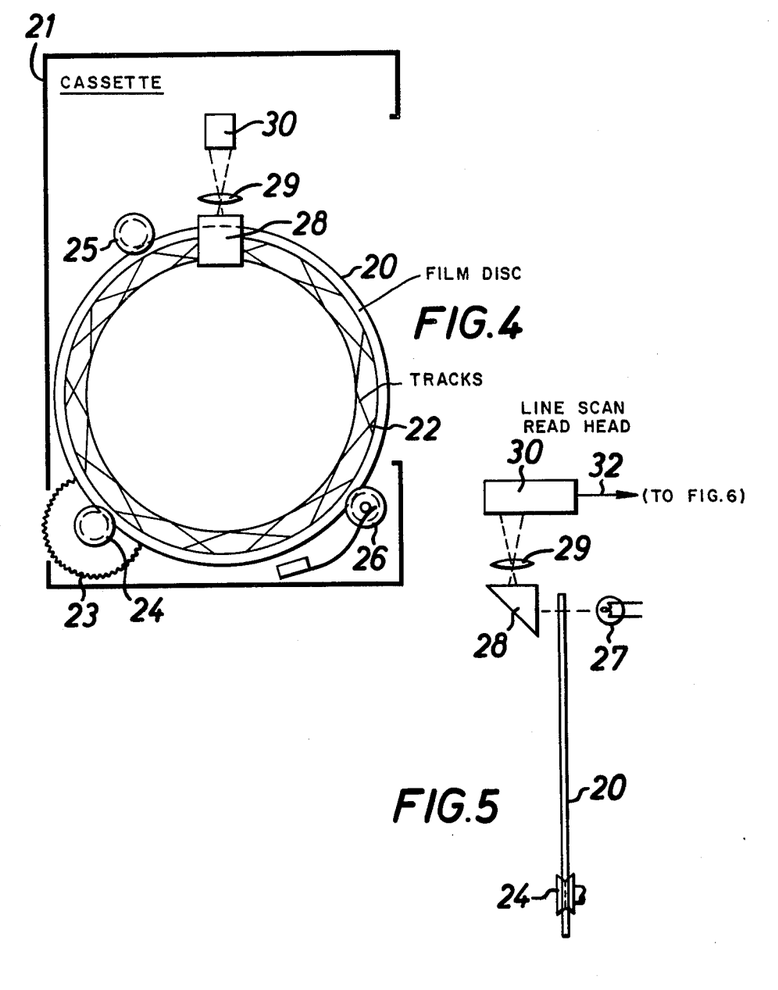
FIG. 4 is a schematic layout of a further embodiment of the invention where a photographic disc is used instead of the photographic film of the arrangement of FIG. 1.
FIG. 5 is a side elevational view of the arrangement of FIG. 4.

In a further embodiment of the invention illustrated in FIG. 4, the film of the embodiment of FIG. 1 is replaced by a photographic film disc 20 located in a cassette 21. The periphery of the disc is provided with a photographically recorded coded pattern of tracks 22, a track of the pattern representing for instance, a line of print of the original data. The disc is rotated manually at slow speed by means of a knurled wheel 23 partially projecting through the side of the cassette 21, rotation of wheel 23 effecting rotation of a V drive roller 24 which engages the peripheral edge of disc 20. A further V guide roller 25 engages the peripheral edge of disc 20 and a spring loaded V guide roller 26 is biassed into engagement with the peripheral edge of the disc 20.

Light from a light source 27 is projected on to the film surface of disc 20 and reflected from prism 28 and via lens 29 to a line scan photoelectric reading head 30. The output from the reading head 30 is supplied serially to the input of a multi-stage shift register 31 (FIG. 6) via line 32.

Figure 6:
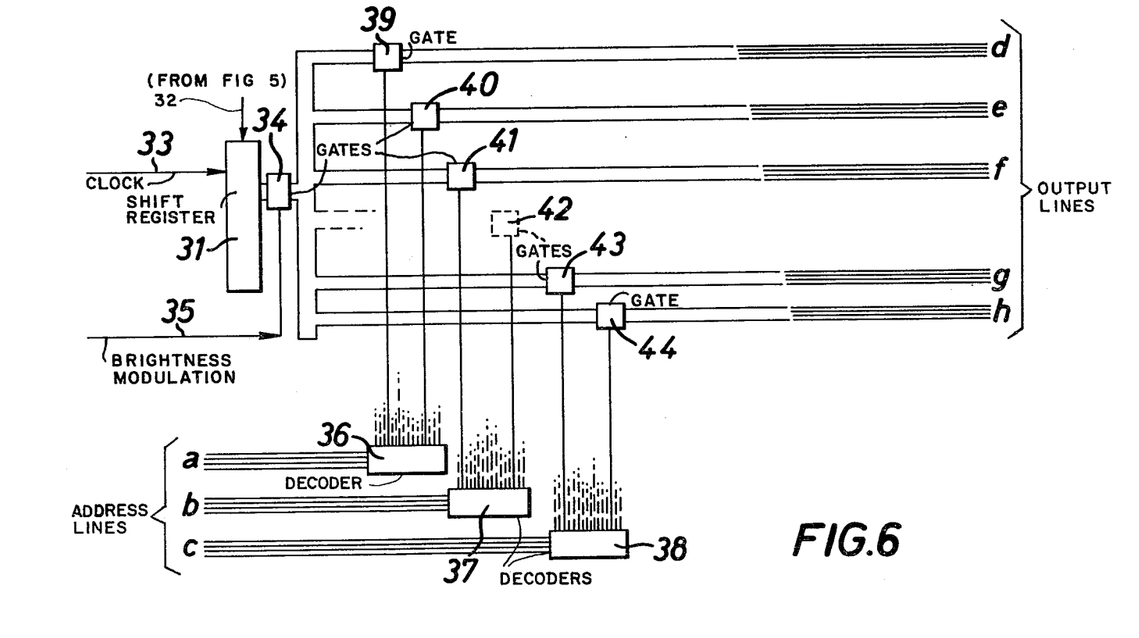
FIG. 6 is a block diagram of the scanning method used in the embodiment of FIGS. 4 and 5 and FIG. 7 is a more detailed circuit diagram of the components of the scan generator used in the embodiment of FIG. 6.

The shift register 31 is preferably a 9-stage shift register. As previously indicated, the decoder circuit comprising X and Y scan sections is introduced between the respective X and Y scanning generators of the display and the photocells of the photoelectric reading head 30, and controls the scanning matrix of the display panel. Coded data from the photoelectric reading head is supplied serially to the recycling shift register 31. The coded data represents say a page of original data divided into groups of lines, say 9 or more, which are scanned, one by one from the recycling shift register 31, which selects each line in response to the receipt of a clock pulse applied to the register 31 over line 33 and recodes the data in response to a brightness modulation signal applied to transmission gate 34 over line 35, together with the outputs from shift register 31. It should be noted that transmission gate 34 is used for the Y scan only and that this gate selects the polarity of the signals for the Y scan relative to the X axis.

Address data representative of the location of the original data is present on address lines a, b, c, the data comprising a 12 bit address (3×4 bit hexadecimal code) and supplied to 4 input/16 output lines address decoders 36, 37, 38, each connected to a plurality of transmission gates 39 to 44 inclusive, each having a plurality of groups of output lines d, e, f, g, h, connected to the X or Y scan generators of the visual display device, the particular group of output lines d to h enabled depending on the particular transmission gate 39 to 44 selected by the line address decoders 36, 37, 38.

In the above described embodiment the visual display device is of the electrophoretic type described previously and the matrix of the display device forms an extension of the scanning generator connections. Four connectors are required for the upper glass panel i.e. one for the clock pulse input, one for the 'bright up' modulation signal and two voltage supply connections, the lower plate requiring in addition connections corresponding to the twelve inputs to the address decoders 36, 37, 38.

It should be noted that the output lines from the transmission gates 39 to 44 are contiguous but are shown separately grouped in FIG. 6 for illustrative purposes only. Furthermore, for the Y scan, similar groupings to those used for the X scan are used, but since a page of original data is narrower than its length, fewer address decoders are required and in fact only two address decoders are required for the X scan compared with three for the Y scan. The grouping of the vertical lines or columns of the matrix are one alpha numerical character plus its spacing in width.

Synchronism between the X and Y scans is maintained by driving the X scan shift register from the last Y scan address.

Figure 7:
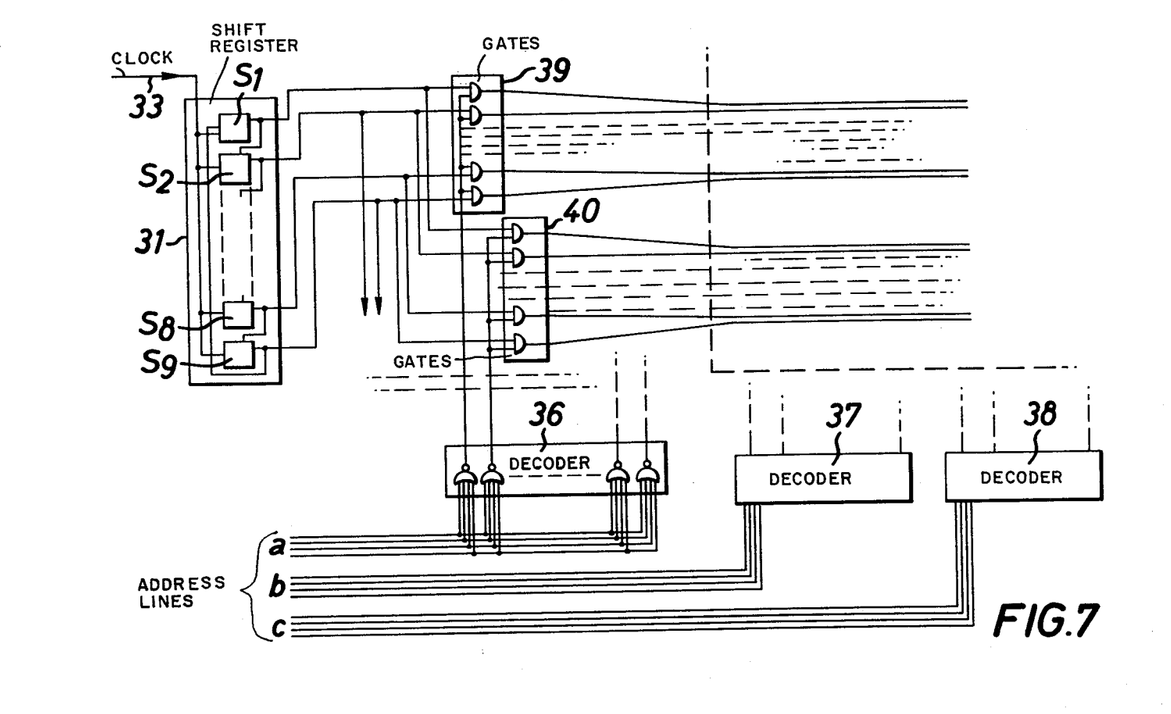

A more detailed circuit for the X scan is shown in FIG. 7. The shift register 31 includes 9 stages $S_1$ to $S_9$ and is supplied with clock pulses over line 33. As previously indicated, the X scan does not require transmission gate 34 (FIG. 6) and shift register 31 feeds all typescript lines selected by the address decoder. The 4-line address data is supplied in parallel on input lines a, b, c to the hexadecimal address decoders 36, 37, 38, three of which are used for the X scan. The outputs of the 4-line-input to 16-line-output matrix connections of the decoders 36, 37, 38 are connected to a plurality of script line select gates 39, 40 and the outputs from the select gates are connected to the X scan coordinates of the matrix of the visual display device (not shown).

It will be appreciated that although the invention has been described with particular reference to the recording of original data photographically reproduced on photographic record media, the record media may be other than photographic films, for example magnetic tape or other magnetic record media. By means of a different decoder circuit, e.g. an alternative programme on the microprocessor, serial information may be collected from a telephone to produce a page of typescript.

A further use of the data processing unit is as a fascimile transmitter since the matrix may be coded in any way and hence could produce pictorial information.

In the embodiment of the invention relating to microrecords e.g. microfische or microfilm, any means for securing the data on the mirorecord may be used, and any means for correlating the position of the data on the mirorecord with the edge or reference point of the display matrix.

What we claim is:

1. Apparatus for providing a humanly legible visual display of alphanumeric characters recorded as digitally coded data on a photographic film, said digitally coded data being arranged in lines corresponding to a line of alphanumeric characters is an original form at and also including a digitally coded address portion identifying the relative placement of said line of alphanumeric characters within said original format, said apparatus comprising:

a light source;
    a photoelectric scanning head for generating sequential digitally coded electrical signals representative of one of said respective lines of coded data;
    means for controllably positioning said film relative said scanning head such that any desired one of said lines of data scan is sequentially scanned by said scanning head;
    a two-dimensional visual matrix display and memory device comprising parallel row electrodes running in a first direction and parallel column electrodes running in a second direction; and
    decoder means connected to receive said coded electrical signals from said scanning head and to selectively activate respective pairs of display row and column electrodes in accordance therewith at a displayed line location corresponding to said digitally coded address data.

2. Apparatus for displaying in humanly legible visual form, display data recorded together with address data specifying its relative display location with respect to other recorded display data, said display and address data being prerecorded on a medium in a digitally coded form, said apparatus comprising:

scanning means for mechanically scanning said medium in a first dimension and for also scanning said medium in a second dimension with an electrical transducer to sequentially generate coded display and address electrical signals repesentively representative of said display data and of said address data;
    decoding means cooperating with said scanning means for receiving said coded electrical signals and generating in response thereto decoded two-dimensional display address signals and decoded data signals representing respectively corresponding alphanumeric character elements in a dot-line matrix format; and
    a two-dimensional matrix visual display and memory means responsive to said decoded two-dimensional display address signals and to said decoded data signals for selectively providing visible displayed dot-line matrix elements of alphanumeric characters corresponding to said display data and positioned within the overall display at relative positions in accordance with said address data;
    said record medium being a photographic film disc having coded data recorded on tracks around the periphery of the disc and said scanning means comprising a photoelectric scanning device arranged to supply said coded electrical signals; and
    said disc being located within a cassette and provided with manually operable driving means for moving the disc past the scanning device.

3. Apparatus for reproducing characters which have been converted from an original form into coded data recorded on a first record medium into characters having the original form as a visual display on a second record medium, said coded data representing in addition to the characters to be displayed, the address indicative of the physical location of the characters on the second record medium, said apparatus including:

means for randomly accessing and reading the coded data to sequentially generate signals representative thereof;

a matrix-type visual display unit having a matrix of conductor electrodes forming said second record medium;

X and Y scanning generators connected to control said matrix-type visual display unit;

decoding means introduced between said X and Y scanning generators to control the scanning matrix of the display unit, and responsive to the randomly accessed and read signals representative of the coded data from said reading means to convert said signals into signals having a matrix format, said latter signals being supplied to the X and Y scanning gnerators and thence to the matrix of conductor electrodes of the display device to selectively energize the electrodes to reproduce in the display device a legible indication of the original data in its original non-coded form even though randomly accessed by said reading means, and means for overwriting the data displayed in the display unit by initially erasing at least part of the data displayed followed by re-addressing the display with new data to produce a changing display of the original data in the display unit in accordance with the randomly accessed coded data successively read by said reading means.

4. Apparatus as claimed in claim 3 wherein, said means for reading comprises a reading head and means for advancing said medium passed said reading head.

5. Apparatus as claimed in claim 3 wherein said medium comprises a microrecord.

6. Apparatus as claimed in claim 3 wherein said display unit includes an electrophoretic memory unit having a matrix of electrodes, signals indicative of said date signals being selectively supplied to said electrodes to effect said visual display.

7. Apparatus for displaying in humanly legible visual form, display data recorded together with address data specifying its relative display location with respect to other recorded display data, said display and address data being prerecorded on a medium in a digitally coded form, said apparatus comprising:

scanning means for mechanically scanning said medium in a first dimension and for also scanning said medium in a second dimension with an electrical transducer to sequentially generate coded display and address electrical signals respectively representative of said display data and of said address data;

decoding means cooperating with said scanning means for receiving said coded electrical signals and generating in response thereto decoded two-dimensional display address signals and decoded data signals representing respectively corresponding alphanumeric character elements in a dot-line matrix format; and a two-dimensional matrix visual display and memory means responsive to said decoded two-dimensional display address signals and to said decoded data signals for selectively providing visible displayed dot-line matrix elements of alphanumeric characters corresponding to said display data and positioned within the overall display at relative positions in accordance with said address data.

8. A data processing unit as claimed in claim 7 wherein said visual display comprises an electrophoretic display and memory means having electrodes formed on each of upper and lower glass plates, the electrodes being brought out to the edges of the plates to form electrical connections to thin film semiconductor logic circuits comprising X and Y scanning generators.

9. The apparatus of claim 7 wherein the record medium is a photographic film disc having coded data recorded on tracks around the periphery of the disc and said scanning means comprises a photoelectric scanning device arranged to supply said coded electrical signals.

10. The apparatus of claim 7 wherein:

said scanning means comprises a scanning head capable of electronically scanning in one direction and means for advancing said medium past said scanning head in a second direction transverse to said one direction.

11. The apparatus of claim 7 wherein said medium is photographic film and said scanning means comprises a reading head and means for advancing said film past said reading head.

12. The apparatus of claim 7 wherein said medium comprises a magnetic medium.

13. The apparatus of claim 7 wherein said medium comprises a microrecord.

14. The apparatus of claim 13 wherein said scanning means comprises:

a photoelectric reading head, a scan generator, and a position encoder, said scan generator being responsive to position signals provided by said position encoder representative of the position of the microrecord along a first dimension and also generating control signals connected to electrically scan said reading head in a second dimension, said position signals also being utilized as address data to identify the relative row or line display position within said display and memory means; and said display and memory means including gating means, responsive to coded display electrical signals from said reading head, for selectively activating corresponding ones of the columns of electrodes within said display and memory means.

15. The apparatus of claim 7 wherein a predetermined group of said coded display address signals are supplied in parallel to a plurality of address decoding X and Y scan sections within said decoding means, each scan section including a recycling register responsive to a timing signal and arranged for the Y scan section to effect recording of the decoded data signals, which are presented as a brightness modulation signal applied to a transmission gating device in conjunction with decoded display address signals output from the recycling register of said Y scan section, signals from said gating device being supplied to a plurality of further transmission gating devices of a matrix in conjunction with decoded display address signals output from said X scan section to provide a two-dimensional X and Y coordinate visual dot-line matrix display of alphanumeric characters.

16. The apparatus of claim 15 wherein synchronism between the X and Y scan sections is maintained by driving the recycling-register of the X scan section from the Y scan section.

17. The apparatus as claimed in claim 15 wherein said visual display comprises an electrophoretic device having electrodes and memory means formed on each of upper and lower glass plates and further including X and Y scanning generators connected thereto, a pair of voltage supply leads being connected to each of the glass plates, one of said plates additionally having connections supplied to the Y scan section recycling register and the first mentioned transmission gating device and the other glass plate additionally having connections corresponding in number to the input connections to the X and Y scan section.

* * * * *